(12) United States Patent
Filmer

(10) Patent No.: US 10,287,736 B2
(45) Date of Patent: *May 14, 2019

(54) ANIMAL WASTE REMOVAL APPARATUS

(71) Applicant: Mike Filmer, Gretna, NE (US)

(72) Inventor: Mike Filmer, Gretna, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/887,558

(22) Filed: Feb. 2, 2018

(65) Prior Publication Data

US 2018/0223489 A1 Aug. 9, 2018

Related U.S. Application Data

(63) Continuation of application No. 15/693,835, filed on Sep. 1, 2017, now Pat. No. 9,920,495.

(60) Provisional application No. 62/382,482, filed on Sep. 1, 2016.

(51) Int. Cl.
| | | |
|---|---|---|
| *E01H 1/12* | (2006.01) | |
| *A01K 29/00* | (2006.01) | |
| *A01K 23/00* | (2006.01) | |

(52) U.S. Cl.
CPC .......... *E01H 1/1206* (2013.01); *A01K 23/005* (2013.01); *E01H 2001/1293* (2013.01)

(58) Field of Classification Search
CPC ............................. E01H 1/1206; A01K 23/005
USPC .... 294/1.3, 1.4, 1.5; 15/257.1, 257.2, 257.4, 15/257.7, 257.8; D30/162
See application file for complete search history.

(56) References Cited

U.S. PATENT DOCUMENTS

| | | | | |
|---|---|---|---|---|
| 3,170,183 A | * | 2/1965 | Leatherman | A47L 13/52 15/143.1 |
| 3,870,300 A | * | 3/1975 | Amendola | A63B 57/50 473/391 |
| D285,012 S | * | 8/1986 | Willis | 294/1.4 |
| 5,190,326 A | * | 3/1993 | Nunn | A01K 1/0114 15/257.6 |
| D411,788 S | * | 7/1999 | Watson | D8/13 |
| 5,924,162 A | * | 7/1999 | Kalscheur | A46B 17/06 15/142 |
| 6,039,369 A | * | 3/2000 | Stahovic | E01H 1/1206 15/257.2 |
| 6,052,860 A | * | 4/2000 | Coxsey | A47L 13/52 141/316 |
| 6,398,278 B1 | * | 6/2002 | Orr | E01H 1/1206 15/104.8 |
| D507,944 S | * | 8/2005 | Crews | D8/13 |

(Continued)

*Primary Examiner* — Paul T Chin
(74) *Attorney, Agent, or Firm* — Suiter Swantz pc llo

(57) ABSTRACT

An animal waste removal and collection system may include a waste removal apparatus with a handle, a blade connected proximate to an end of the handle, and a comb connected proximate to the end of the handle opposite the blade. The waste removal apparatus is configured to be supported on a support surface at a first contact point of the blade with the support surface and at multiple second contact points of the comb with the support surface. The animal waste removal and collection system may also include a waste collection apparatus with another handle and a pan connected proximate to an end of the second handle. The pan includes a base and walls extending upwardly from the base, where one of the walls includes a slot to interface with the blade and another one of the walls includes a second comb to interface with the first comb.

12 Claims, 14 Drawing Sheets

(56) References Cited

U.S. PATENT DOCUMENTS

| | | | |
|---|---|---|---|
| 8,777,283 B2* | 7/2014 | McNair | E01H 1/1206 294/1.4 |
| 8,827,334 B2* | 9/2014 | Endara | E01H 1/1206 15/257.2 |
| 9,549,653 B1* | 1/2017 | Kapuriya | B65D 29/00 |
| 2013/0270846 A1* | 10/2013 | Buhagiar | E01H 1/1206 294/1.4 |
| 2013/0313842 A1* | 11/2013 | McNair | E01H 1/1206 294/1.4 |
| 2014/0077511 A1* | 3/2014 | Endara | E01H 1/1206 294/1.4 |

* cited by examiner

ANIMAL WASTE REMOVAL APPARATUS

CROSS-REFERENCE TO RELATED APPLICATIONS

The present application is a continuation under 35 U.S.C. § 120 of U.S. patent application Ser. No. 15/693,835 (U.S. Pat. No. 9,920,495), filed Sep. 1, 2017, and titled "ANIMAL WASTE REMOVAL APPARATUS," which claims the benefit under 35 U.S.C. § 119(e) of U.S. Provisional Application Ser. No. 62/382,482, filed Sep. 1, 2016, and titled "ANIMAL WASTE REMOVAL APPARATUS," which is herein incorporated by reference in its entirety.

BACKGROUND

Feces are solid or semisolid food remains discharged during defecation. Feces may be collected for use as fertilizers and soil conditioners.

DRAWINGS

The Detailed Description is described with reference to the accompanying figures. The use of the same reference numbers in different instances in the description and the figures may indicate similar or identical items.

FIG. 1 an isometric view illustrating an animal waste collection and removal system in accordance with an example embodiment of the present disclosure.

Figure 1:
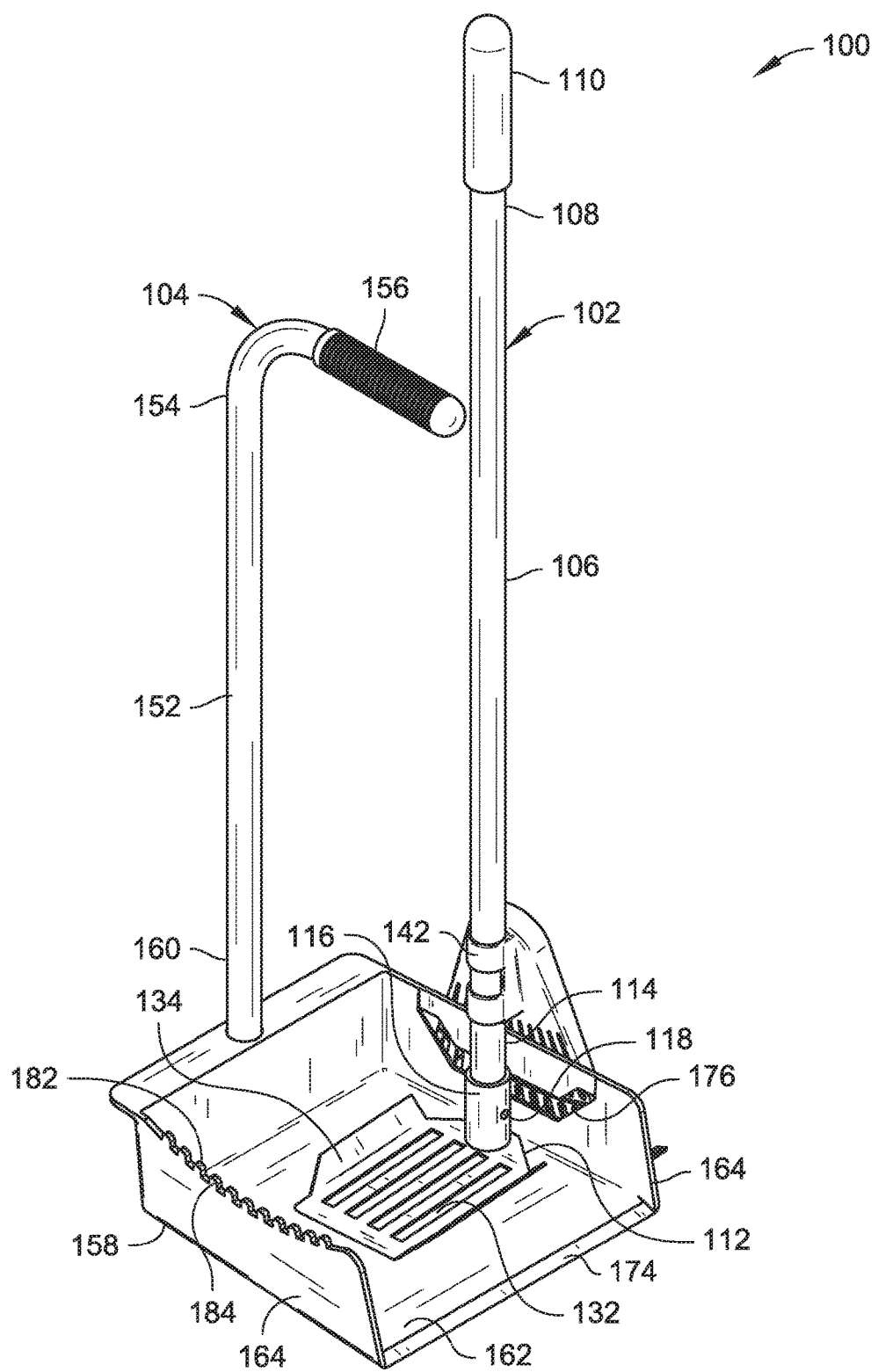
Figure 2:
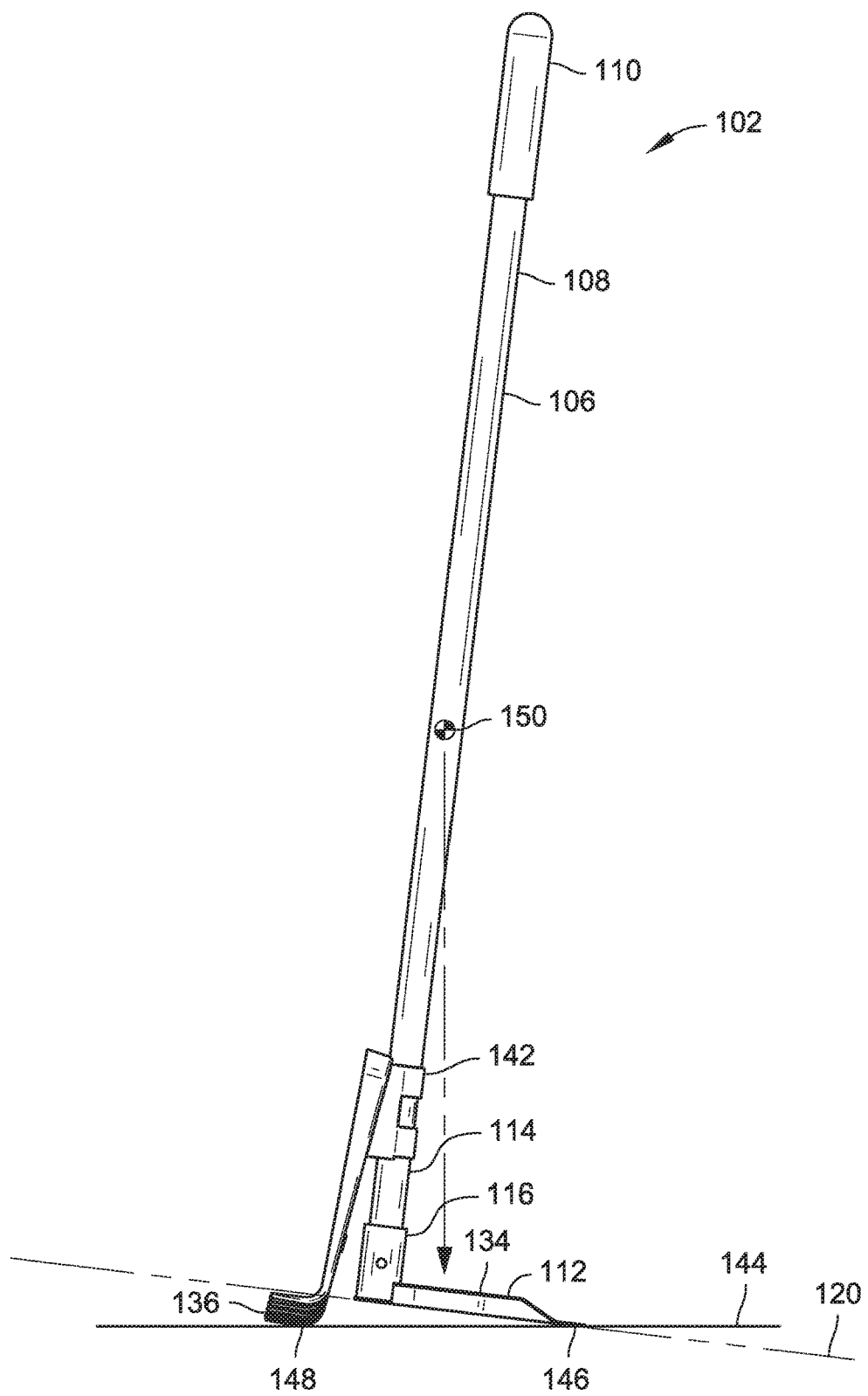
FIG. 2 is a side elevation view of an animal waste collection apparatus for an animal waste collection and removal system, such as the animal waste collection and removal system illustrated in FIG. 1, in accordance with an example embodiment of the present disclosure.
Figure 3:
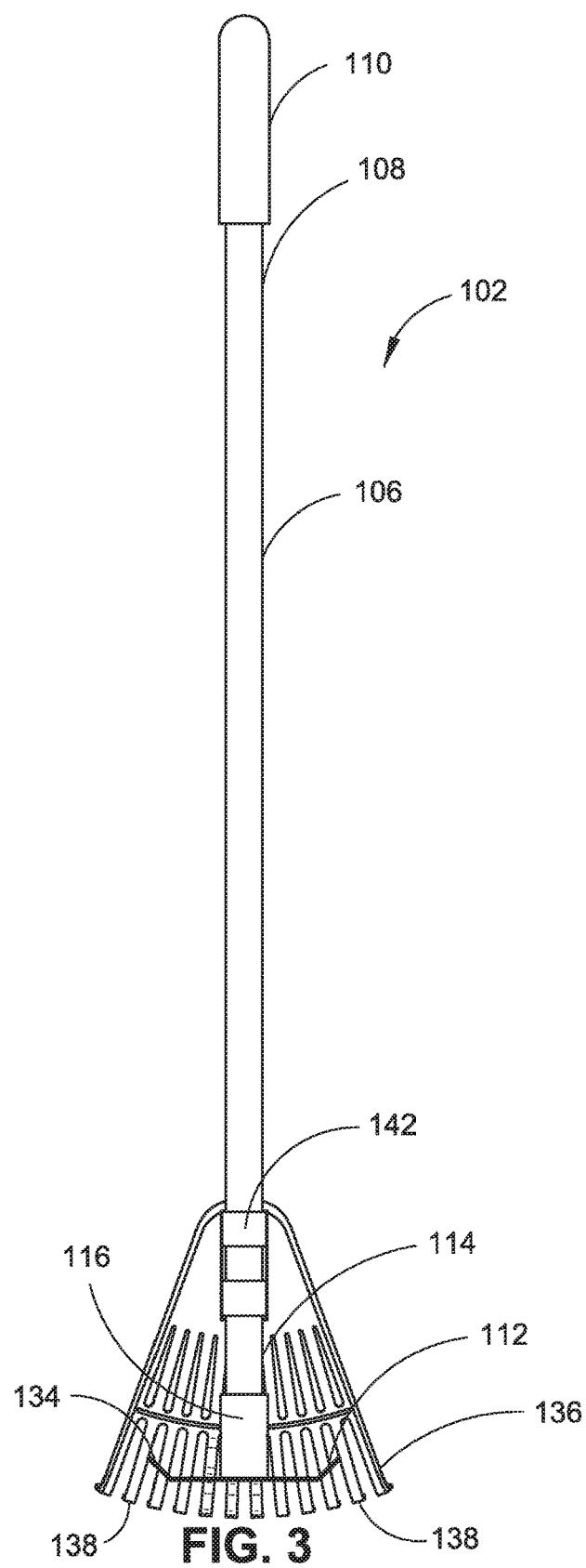
FIG. 3 is an end view of the animal waste collection apparatus illustrated in FIG. 2.
Figure 4:
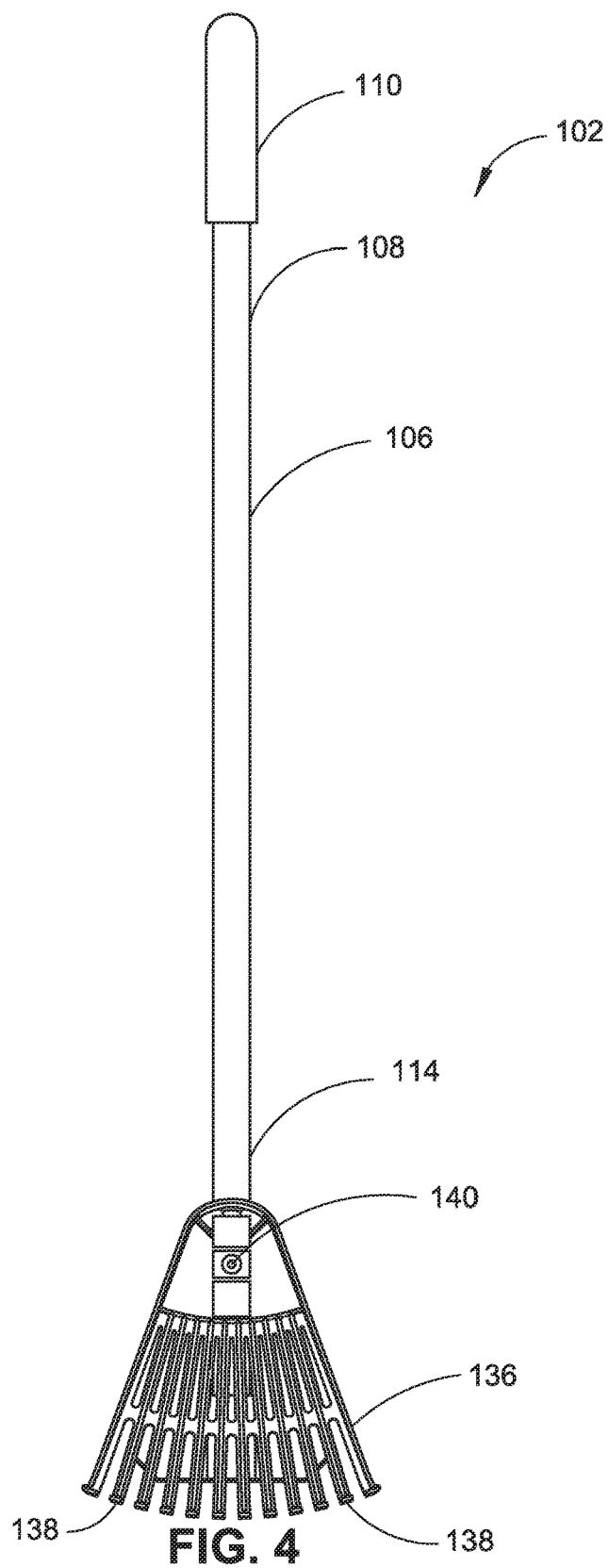
FIG. 4 is another end view of the animal waste collection apparatus illustrated in FIG. 2.
Figure 5:
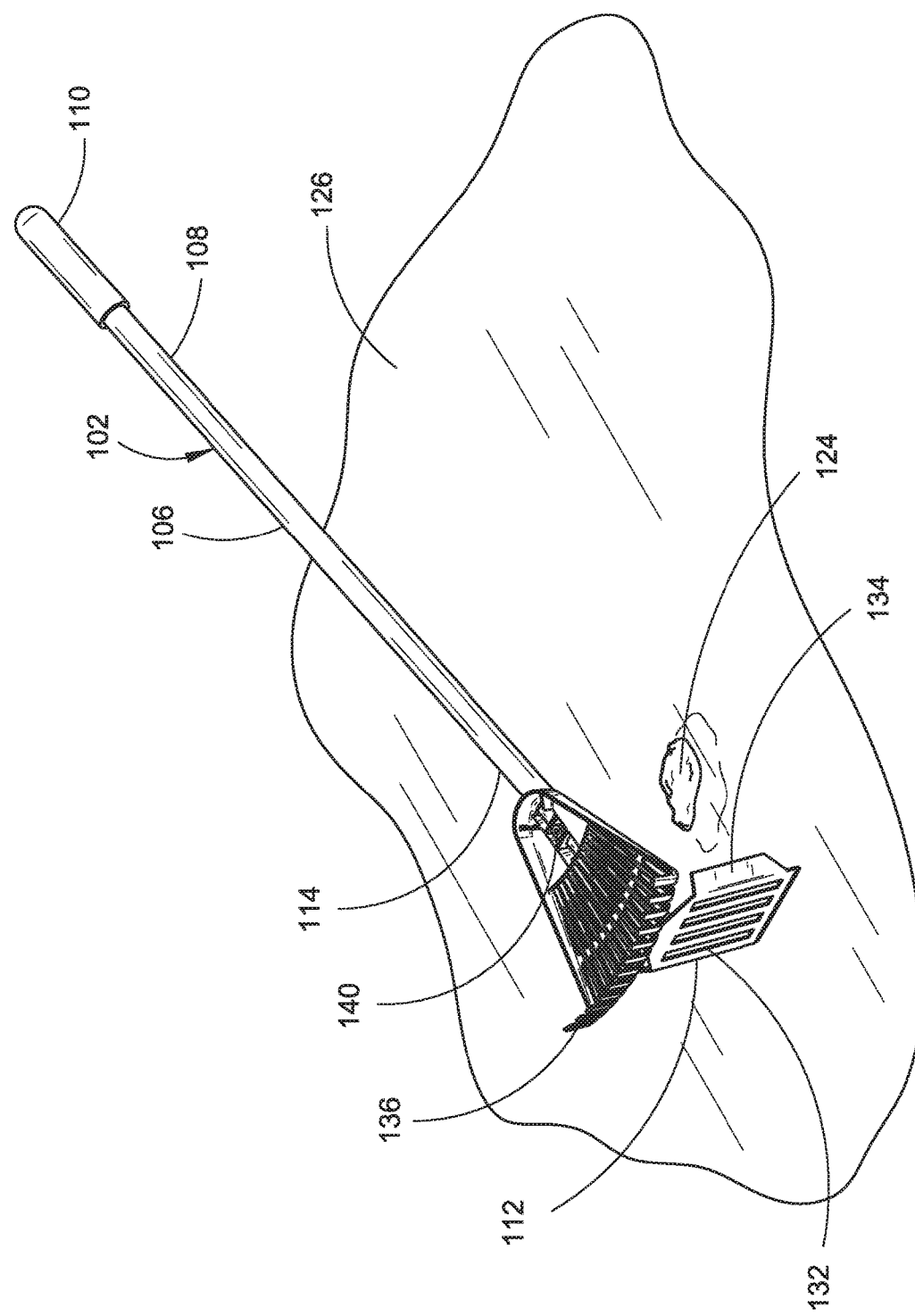
FIG. 5 is an environmental view of the animal waste collection apparatus illustrated in FIG. 2.
Figure 6:
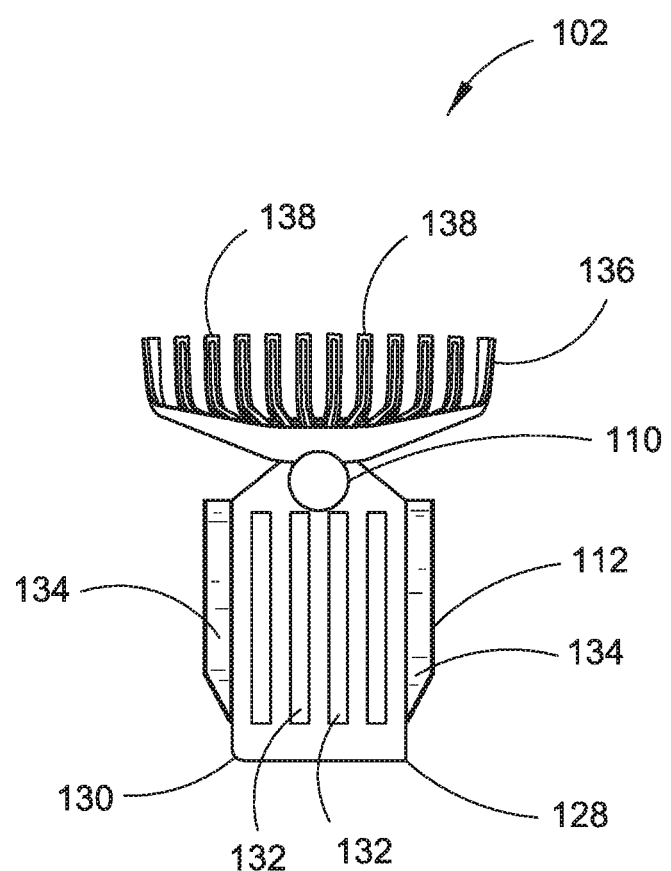
FIG. 6 is a top view of the animal waste collection apparatus illustrated in FIG. 2.
Figure 7:
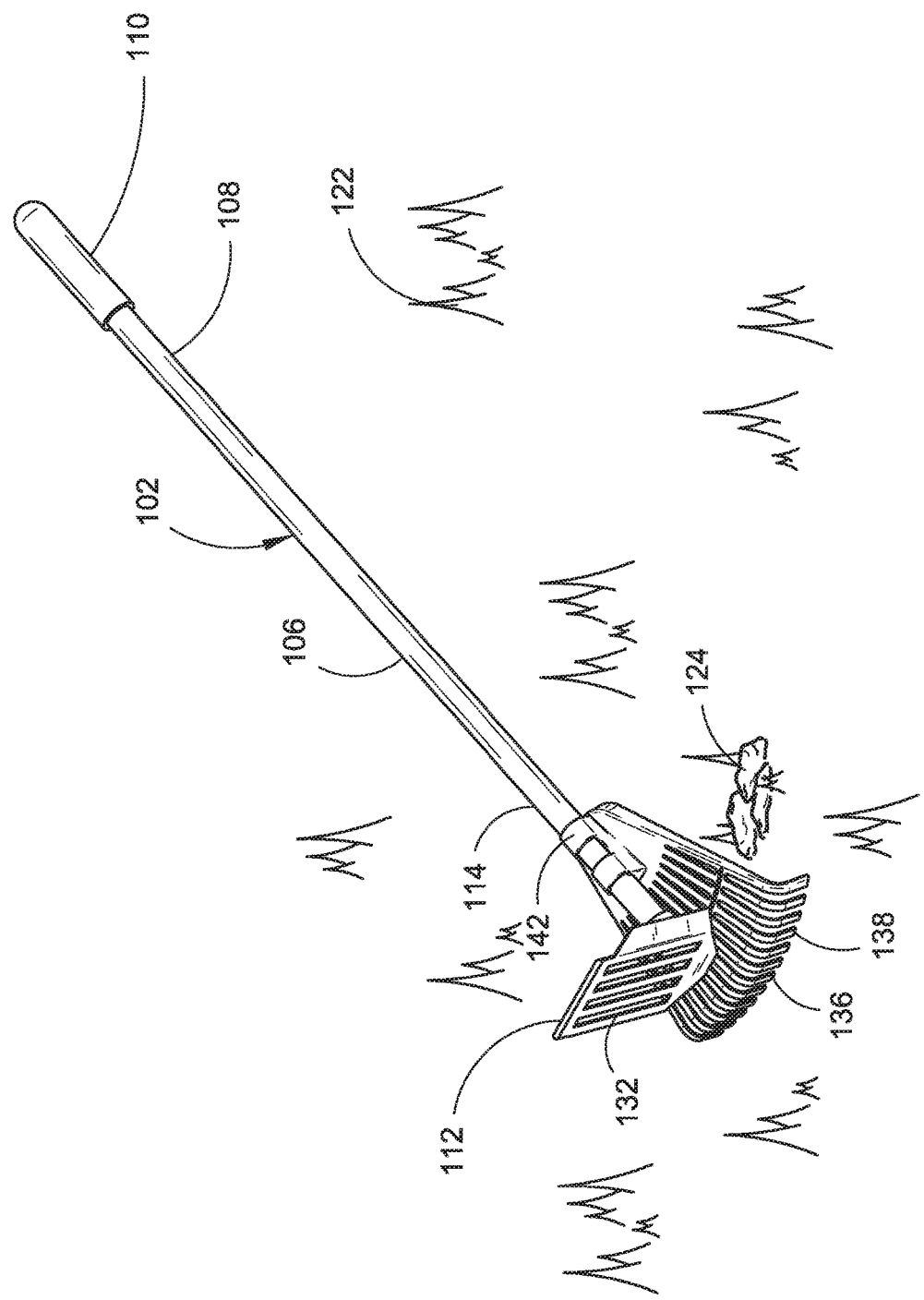
FIG. 7 is another environmental view of the animal waste collection apparatus illustrated in FIG. 2.
Figure 14:
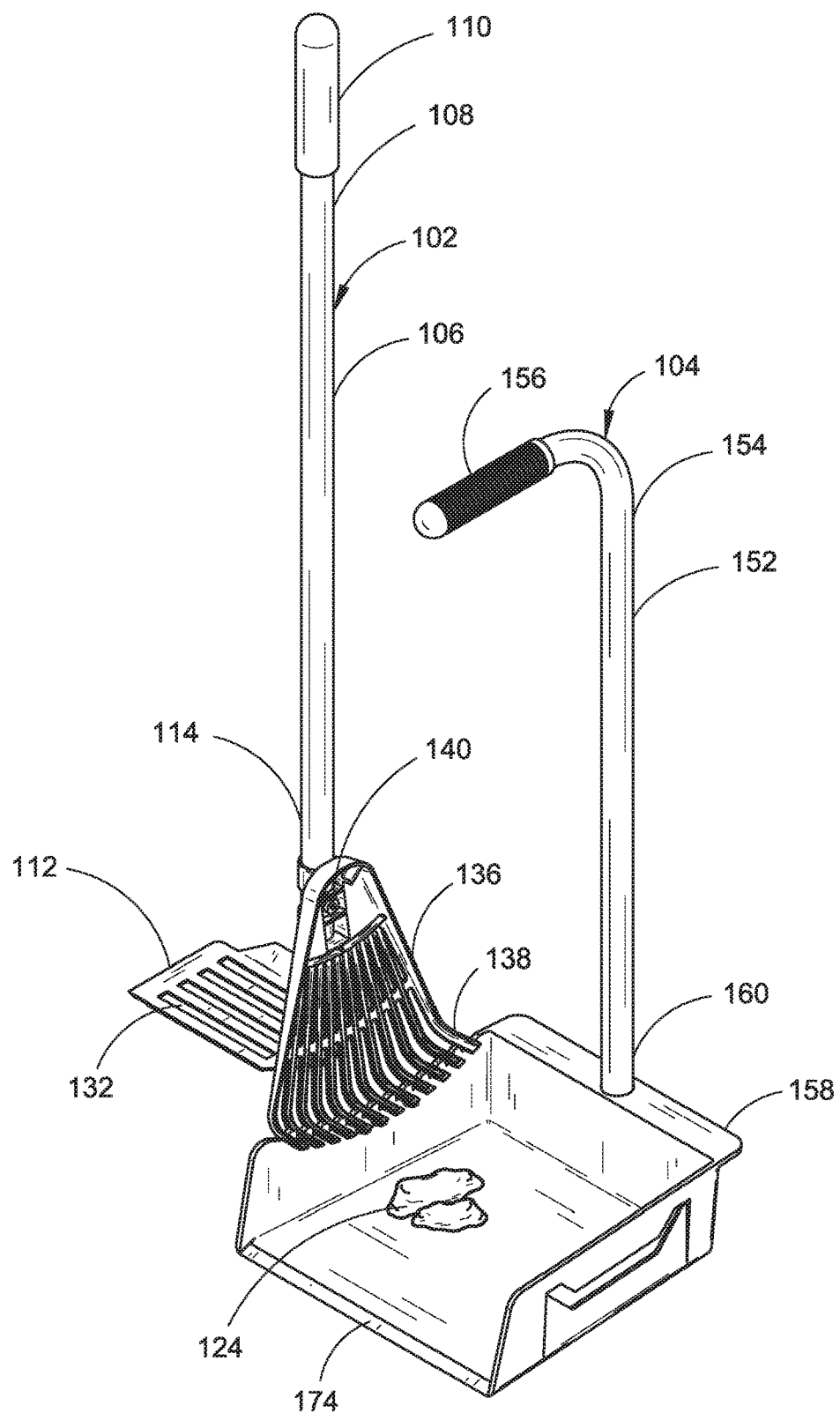

FIG. 14 another isometric view of the animal waste collection and removal system illustrated in FIG. 1.

DETAILED DESCRIPTION

Referring generally to FIGS. 1 through 14, animal waste collection and removal systems 100 are described. In some embodiments, a system 100 includes an animal waste removal apparatus 102 and an animal waste collection apparatus 104. In embodiments of the disclosure, the waste removal apparatus 102 includes a longitudinal handle 106 (e.g., a metal pole such as a steel pole, a wooden pole, a fiberglass pole, a plastic pole, or a pole formed from one or more other materials). In some embodiments, an end 108 of the handle 106 can be configured to be grasped and held by a user and may include a grip 110 (e.g., a rubber grip such as a synthetic rubber grip, a plastic grip, an extruded foam grip, and so forth). Additionally, the end 108 of the handle 106 and/or the grip 110 may be textured to be held by an operator.

The waste removal apparatus 102 may also include a blade 112 disposed (e.g., connected) proximate to another (e.g., opposite) end 114 of the handle 106 (e.g., a metal blade such as a heat-treated alloy steel blade, a plastic blade, or a blade formed from one or more other materials). In some embodiments, the blade 112 is connected to the end 114 of the handle 106 using a ferrule 116 and one or more fasteners 118, such as screws, bolts, rivets, and so forth. The blade 112 may also be connected to the end 114 of the handle 106 using an adhesive material (e.g., glue) in place of or in addition to fasteners. In embodiments of the disclosure, the blade 112 extends in a plane 120 generally perpendicular to the longitudinally extending handle 106 (e.g., as described with reference to FIG. 2).

In embodiments of the disclosure, the blade 112 may be used for scraping and/or lifting runny material off of concrete, grass 122, and/or other surfaces. The blade 112 can also be used for chipping animal waste 124 (e.g., dog feces, cat feces, etc.) out of frozen material 126 (e.g., frozen ice, frozen ground, snow, etc. as described with reference to FIG. 5). For example, the blade 112 can include a sharp corner 128 (e.g., a sharp right corner) for chopping in ice. The blade 112 may also include a rounded corner 130 (e.g., a rounded left corner) as described with reference to FIG. 6. The hoe-like shape of the blade 112 and the sharp corner 128 may aid a user through leverage when scraping, chopping, and/or lifting, while the rounded corner 130 of the blade 112 may allow the user to lift and/or move "nuggets" of material out of depressions in yards and surfaces without the hassle of stubbing a sharp corner, or the repetitive use of outside tines of, for example, a rake.

The blade 112 can also define one or more apertures (e.g., slots 132) for sifting sand, litter box material, and so forth through the blade 112. The slots 132 in the blade 112 may also aid runny material in sliding off the blade 112 when the blade is perpendicular to the ground, e.g., by creating air pockets under the material and/or lessening the friction of the material against the blade 112. In some embodiments, the blade 112 may also include one or more skirts 134 on either or both sides of the blade 112. However, the blade 112 does not necessarily define apertures in the form of slots. Apertures may also be formed in other various shaped (e.g., circle shapes, oval shapes, diamond shapes, etc.). Further, the blade 112 may not necessarily define slots (e.g., having solid top and bottom surfaces). In some embodiments, the side skirts 134 can be rounded and/or angled at one or both ends. The side skirts 134 may help hold material on the blade 112 when sifting and/or lifting the material.

The waste removal apparatus 102 may also include a comb 136 (e.g., a flexible comb, a semi-rigid comb, a rigid comb, etc.) disposed (e.g., connected) proximate to the end 114 of the handle 106 opposite the blade 112. The comb 136 can include a crossbar (e.g., a plastic crossbar, a metal crossbar, or a crossbar formed from one or more other materials) toothed in the manner of a comb. The comb may also be formed using multiple tines 138 (e.g., metal tines, plastic tines, and/or tines formed from one or more other materials) held together by and/or formed with a crosspiece. For instance, the comb 136 is formed as a spring rake for moving material in grass 122 and/or other surfaces, as described with reference to FIG. 7.

In some embodiments, the comb 136 can be connected to the handle 106 using an adapter. For example, a plastic and/or metal adapter can be configured to fixedly receive an end of the comb 136, and the adapter can be connected to the handle 106 using one or more fasteners 140, such as screws, bolts, rivets, and so forth. The comb 136 may also be connected to the handle 106 using an adhesive material (e.g., glue) in place of or in addition to fasteners. In other embodiments, the comb 136 may be formed with and/or permanently affixed to the handle 106 (e.g., co-molded with the handle 106, welded to the handle 106, etc.). The comb 136 may also be formed with an integral ferrule 142. For example, the comb 136 can be formed as a unitary part including the tines 138 and the ferrule 142 through a plastic molding process, such as plastic injection molding. In some embodiments, the comb 136 (e.g., the tines 138) can include one or more reinforcing ribs formed as part of the injection molding process.

In embodiments of the disclosure, the waste removal apparatus 102 is configured to be supported on a support surface 144 (e.g., the ground) at least at a first contact point 146 of the blade 112 with the support surface 144 and at multiple second contact points 148 of the comb 136 with the support surface 144. Further, the blade 112 and the comb 136 can be arranged so that when the waste removal apparatus 102 is set upon a generally level support surface 144 (e.g., the ground), the center of gravity 150 of the waste removal apparatus 102 is disposed vertically between the first contact point 146 and the second contact points 148, and the center of gravity 150 does not exceed the base of support formed by the comb 136 and the blade 112, e.g., as described with reference to FIG. 2.

In some embodiments, the tines 138 of the comb 136 may extend below a plane formed by the blade 112 (e.g., the plane 120 extending generally perpendicular to the longitudinally handle 106). In some embodiments, the comb 136 may extend between about one-half inch (½") and about one inch (1") below the blade 112 (e.g., about three-quarters of an inch (¾"). However, this distance is provided by way of example and is not meant to limit the present disclosure. In other embodiments, the comb 136 may extend more than one inch below the blade, less than one-half inch below the blade, and so forth. In some embodiments, the comb 136 may also extend above the plane 120.

As described herein, the comb teeth and/or tines 138 of the comb 136 may terminate along a substantially straight line at the support surface 144, keeping the waste removal apparatus 102 from tipping side-to-side. Additionally, the width of the blade 112 may be configured to prevent such tipping. However, in other embodiments, flexible tines 138 of the comb 136 may extend along an arc (e.g., along an arc having a ten inch (10") radius) and may deflect to support the waste removal apparatus 102 (e.g., on uneven ground). This may give the waste removal apparatus 102 tripod-like stability. Further, the extension of the tines 138 below the plane 120 and/or the use of flexible tines 138 can facilitate cleaning/scraping of material adhered to the tines 138 (e.g., as more fully described below).

In embodiments of the disclosure, the waste collection apparatus 104 includes a longitudinal handle 152 (e.g., a metal pole such as a steel pole, a wooden pole, a fiberglass pole, a plastic pole, or a pole formed from one or more other materials). In some embodiments, an end 154 of the handle 152 can be configured to be grasped and held by a user and may include a grip 156 (e.g., a rubber grip such as a synthetic rubber grip, a plastic grip, an extruded foam grip, and so forth). Additionally, the end 154 of the handle 152 and/or the grip 156 may be textured to be held by an operator.

The waste collection apparatus 104 may also include a pan 158 disposed (e.g., connected) proximate to another (e.g., opposite) end 160 of the handle 152. The pan 158 can include a base 162 and a multiple walls 164 extending upwardly from the base 162. The pan 158 including the base 162 and/or the walls 164 can be constructed from a metal material such as heat-treated alloy steel, a plastic material, and/or one or more other materials. In some embodiments, one or more of the walls 164 can be configured to be received between the blade 112 and the comb 136 of the waste removal apparatus 102 for storing the waste removal apparatus 102 at least partially on the waste collection apparatus 104, e.g., as described with reference to FIG. 1.

In some embodiments, the pan 158 can be connected to the end 160 the handle 152 using an adapter. For example, a plastic and/or metal adapter can be configured to fixedly receive an end of the pan 158, and the adapter can be connected to the handle 152 using one or more fasteners 166, such as screws, bolts, rivets, and so forth. The pan 158 may also be connected to the end 160 of the handle 152 using an adhesive material (e.g., glue) in place of or in addition to fasteners. In other embodiments, the pan 158 may be formed with and/or permanently affixed to the handle 152 (e.g., co-molded with the handle 152, welded to the handle 152, etc.). The pan 158 may also be formed with an integral ferrule 168. For example, the pan 158 can be formed as a unitary part including the base 162, the walls 164, and the ferrule 168 through a plastic molding process, such as plastic injection molding. In some embodiments, the pan 158 can include one or more reinforcing ribs formed as part of the injection molding process.

Figure 8:
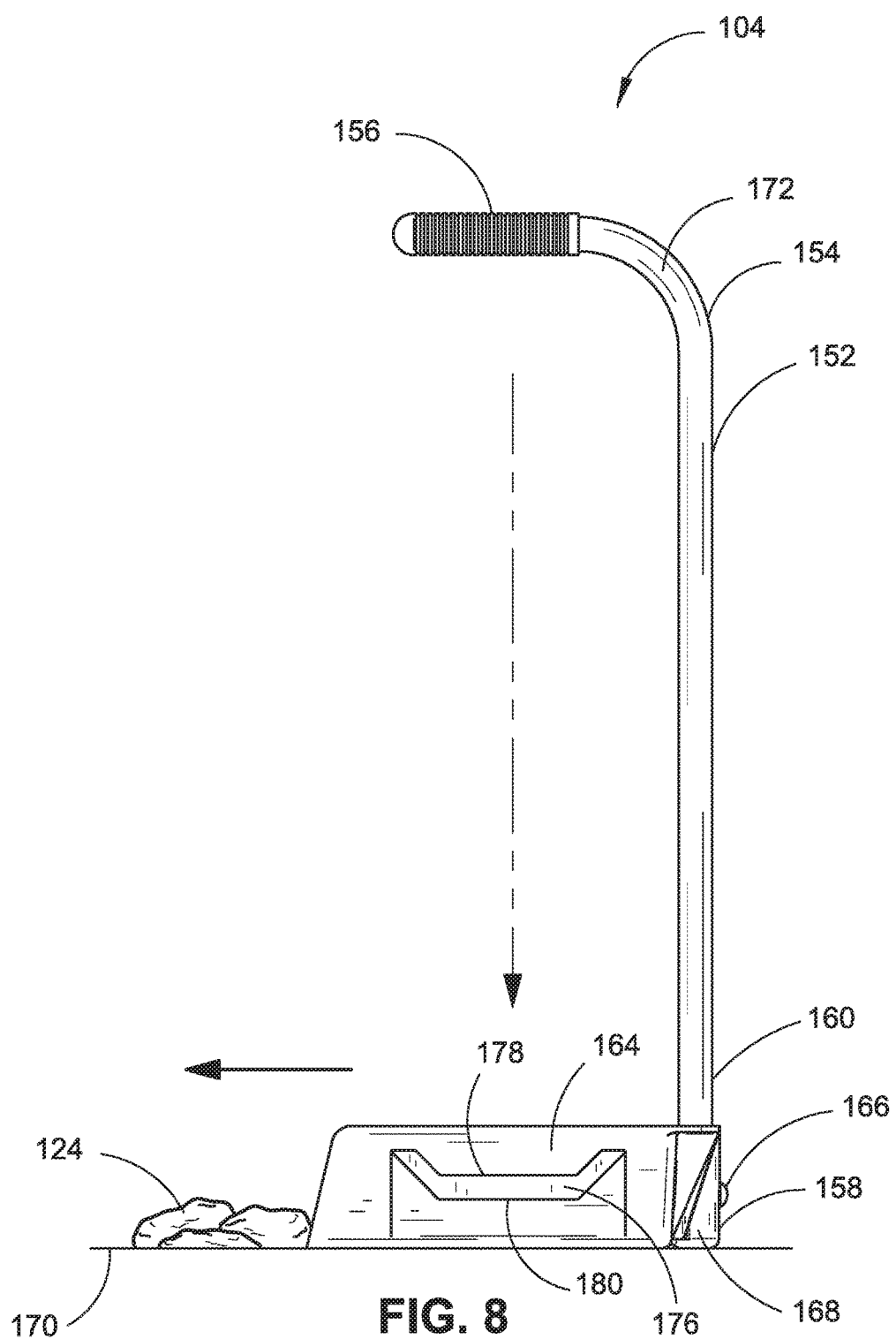
FIG. 8 is a side elevation view of an animal waste removal apparatus for an animal waste collection and removal system, such as the animal waste collection and removal system illustrated in FIG. 1, in accordance with an example embodiment of the present disclosure.
Figure 9:
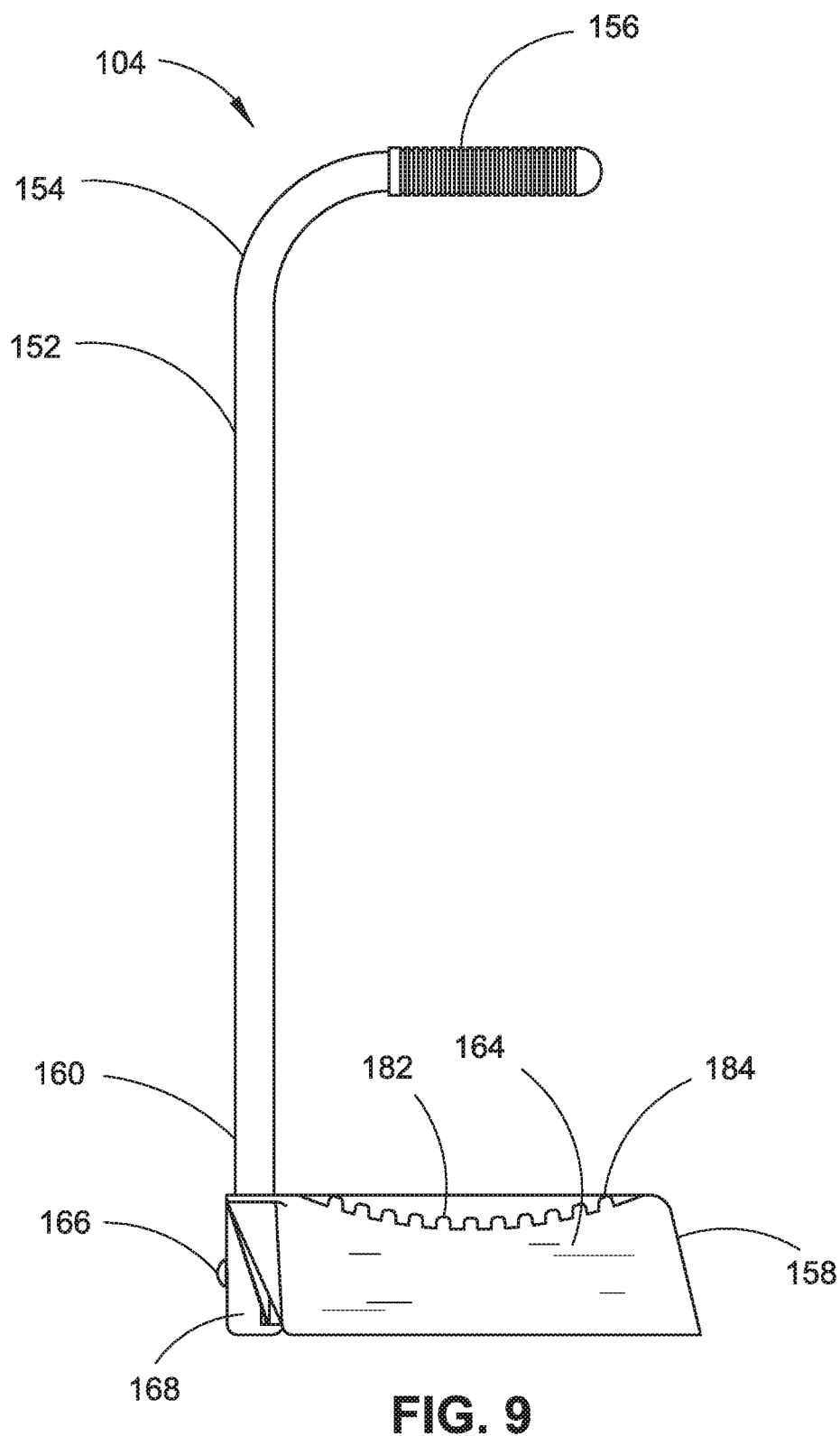
FIG. 9 is another side elevation view of the animal waste removal apparatus illustrated in FIG. 8.
Figure 10:
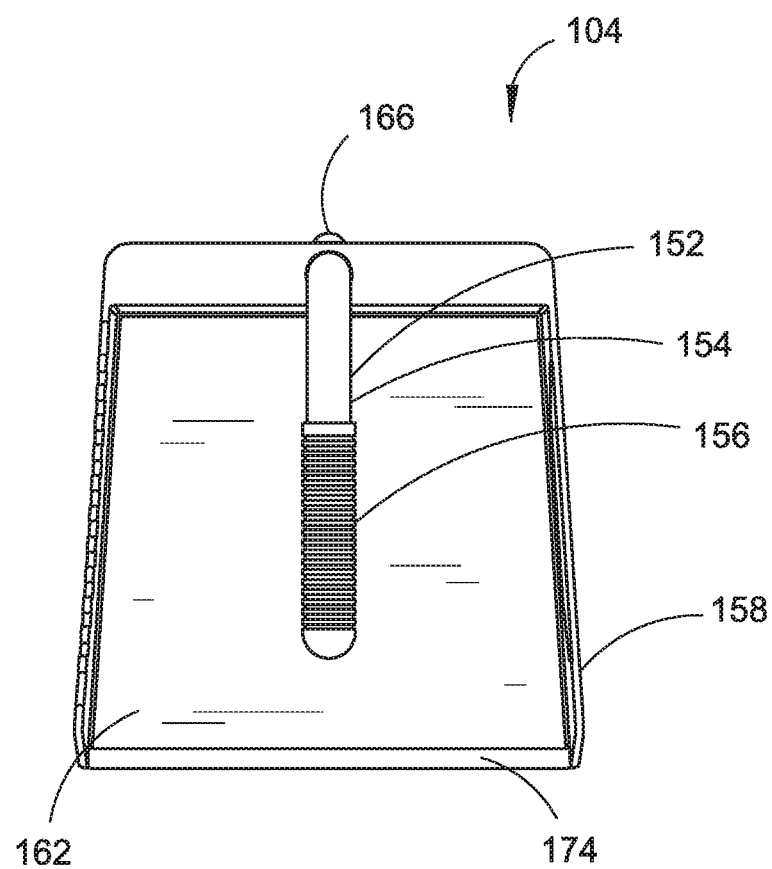
FIG. 10 is a top plan view of the animal waste removal apparatus illustrated in FIG. 8.
Figure 11:
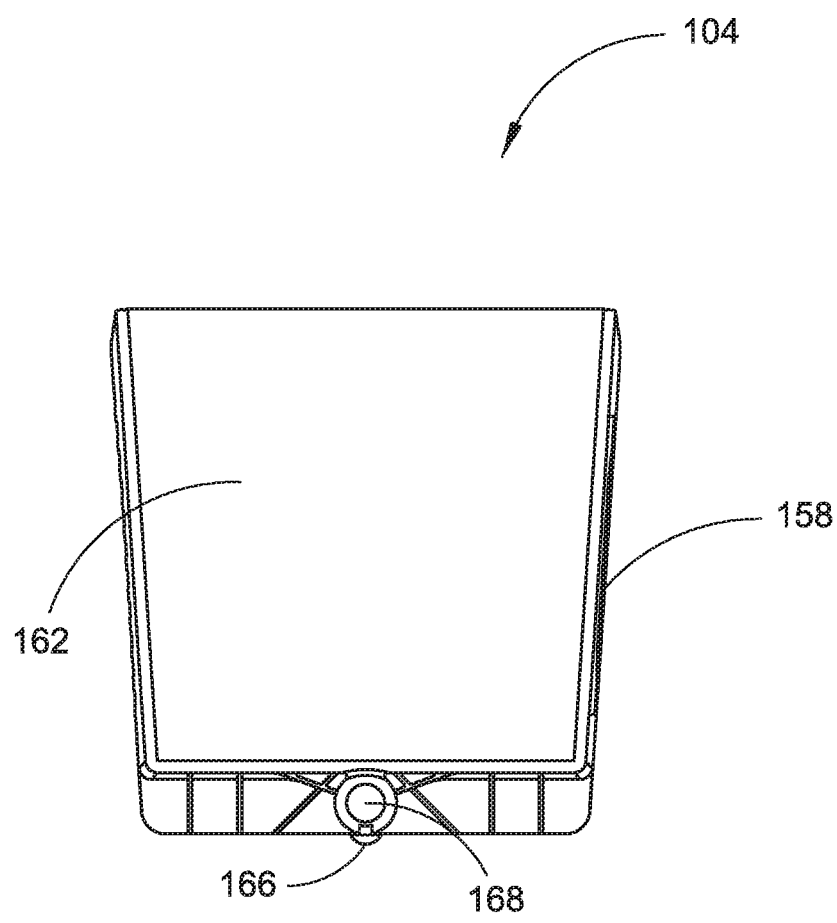
FIG. 11 is a bottom plan view of the animal waste removal apparatus illustrated in FIG. 8.
Figure 12:
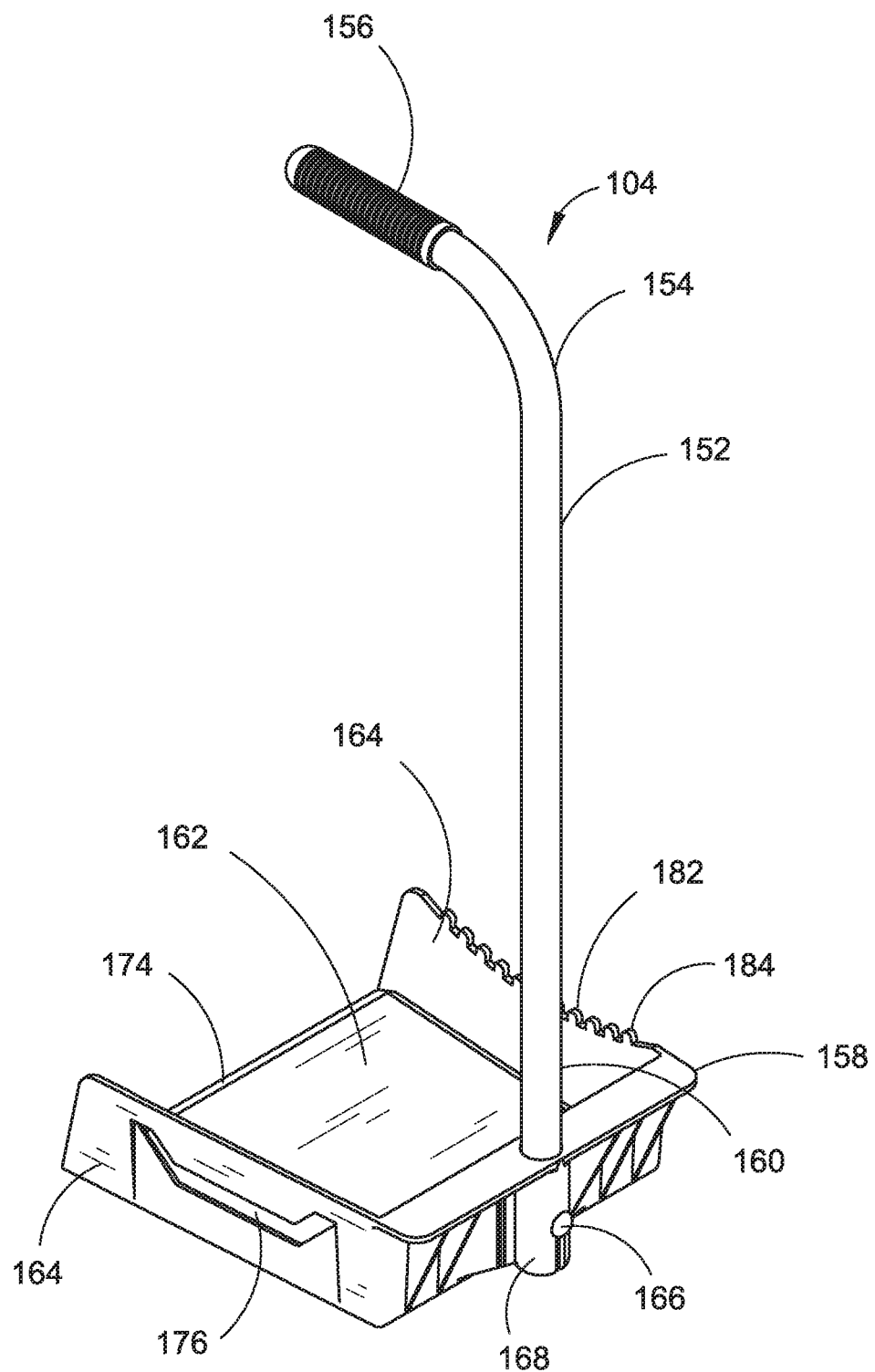
FIG. 12 is an isometric view of the animal waste removal apparatus illustrated in FIG. 8.

In embodiments of the disclosure, the base 162 of the pan 158 extends along a plane 170 generally perpendicular to the longitudinally extending handle 152, e.g., as described with reference to FIG. 8. In embodiments of the disclosure, the waste collection apparatus 104 is configured to be supported on a support surface (e.g., the ground), and the end 154 of the handle 152 (e.g., the grip 156) is disposed (e.g., positioned) vertically between a first end and a second end of the pan 158. For instance, the handle 152 defines a right-angle bend 172 that positions the grip 156 of the handle 152 over the base 162 of the pan 158. This bucket-like handle configuration may provide an operator with added downward leverage and/or control of the pan 158, e.g., by allowing an operator to press downwardly on the handle 152 and hold the pan 158 against the ground. Additionally, in this configuration the grip 156 is positioned in substantially the same orientation with respect to the pan 158 when the pan is turned around (e.g., for left and right handed users, for accessing different walls 164, etc.).

The pan 158 may also define an edge 174 for guiding materials (e.g., waste 124) into the pan 158. The edge 174 may be angled, extending between about one-quarter inch (¼") and one inch (1") into the pan 158 (e.g., about four-tenths of an inch (0.4") into the pan 158). However, this distance is provided by way of example and is not meant to limit the present disclosure. In other embodiments, the edge 174 may extend more than one inch into the pan 158, less than one-quarter inch into the pan 158, and so forth. In some embodiments, the edge 174 may be reinforced (e.g., including a metal strip and/or other reinforcement).

One or more of the upwardly extending walls 164 (e.g., one wall, two walls, three walls, etc.) can include one or more cutouts configured such that material adhered to an implement such as blade and/or a rake can be scraped from the implement into the pan 158. In some embodiments, a cutout can be trench-like in shape (e.g., generally rectangular, trapezoidal, etc.). Further, a cutout can include one or more protrusions, e.g., in the manner of a comb. For example, a wall 164 can define slots such that the wall forms a comb. In other embodiments, tines can be affixed to a wall 164 of the pan 158 (e.g., co-molded, welded, etc.).

Figure 13:
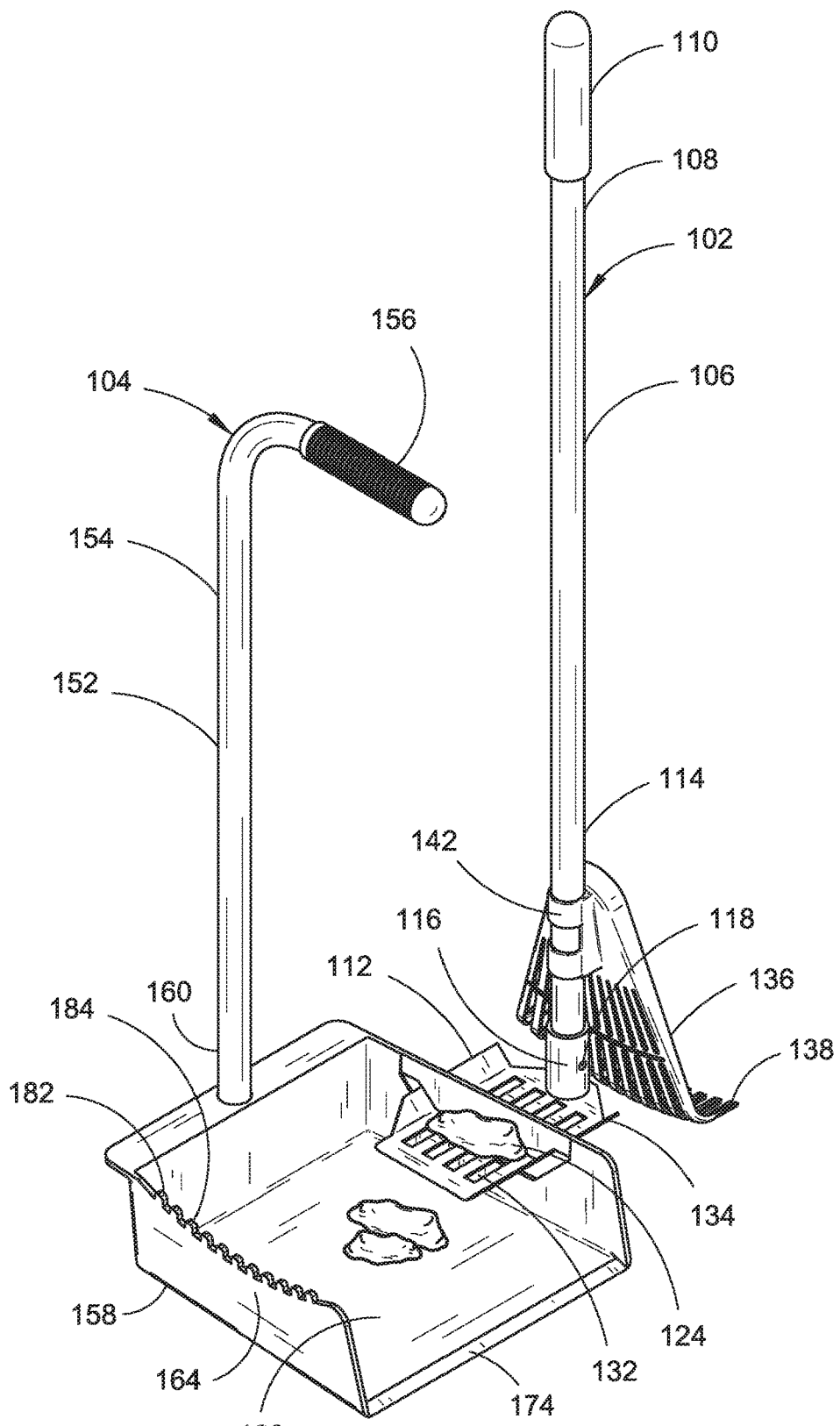
FIG. 13 is an isometric view of the animal waste collection and removal system illustrated in FIG. 1.

In some embodiments, one or more of the upwardly extending walls 164 can include (e.g., define) a slot 176 configured to interface with the blade 112 of the waste removal apparatus 102 for scraping material (e.g., waste 124) adhered to the blade 112 into the pan 158 of the waste collection apparatus 104, e.g., as described with reference to FIG. 13. For example, the slot 176 may be between about one-half inch (½") and one inch (1") in height (e.g., about five-eighths inches (⅝") in height) between a top edge 178 (FIG. 8) and a bottom edge 180 (FIG. 8), and a top surface and/or a bottom surface of a blade 112 may be scraped at the top edge 178 and/or the bottom edge 180 of the slot 176. However, this height is provided by way of example and is not meant to limit the present disclosure. In other embodiments, the slot 176 may be more than one inch in height, less than one-half inch in height, and so forth. In some embodiments, the slot 176 can define one or more angled segments, which can interface with and/or accommodate, for example, the skirts 134 of the blade 112.

In some embodiments, one or more portions of the top edge 178 and/or the bottom edge 180 of the slot 176 may be extended out to form a ledge (e.g., for registering the blade 112 of the waste removal apparatus 102 for scraping). In an example where the pan 158 is formed as a unitary part through a plastic molding process, such as a plastic injection molding process, a ledge can be formed where two injection mold halves meet one another. In another example, a ledge can be formed using a cam extended into a plastic injection mold.

In some embodiments, one or more of the upwardly extending walls 164 can include (e.g., define) a second comb 182 (e.g., a rigid comb, a semi-rigid comb, a flexible comb, etc.) or other structures toothed in the manner of a comb and configured to interface with another comb, such as the crossbar and/or the tines 138 of the comb 136 of the waste removal apparatus 102 for scraping material (e.g., waste 124) adhered to the comb 136 into the pan 158 of the waste collection apparatus 104, e.g., as described with reference to FIG. 14. In other embodiments, the second comb 182 of the pan 158 can interface with a rake or another garden implement. As described herein, the second comb 182 or combs of the pan 158 can be matched in sufficient number of tines 184 and/or relative size to one or more other combs such that material adhered to the second comb 182 can be scraped from the second comb 182 and into the pan 158. For example, the second comb 182 on the pan 158 may include more teeth or tines 184 than a number of teeth or tines on the waste removal apparatus 102.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An animal waste removal apparatus comprising:
   a handle,
   a blade connected proximate to a first end of the handle, and
   a flexible comb connected proximate to the first end of the handle opposite the blade,
   wherein the waste removal apparatus is configured to be supported on a support surface at least at a first contact point of the blade with the support surface and at a plurality of second contact points of the flexible comb with the support surface, wherein a center of gravity of the waste removal apparatus is disposed vertically between the first contact point and the plurality of second contact points when the waste removal apparatus is supported on the support surface,
   wherein the blade is configured to interface with a slot of a waste collection apparatus to scrape material adhered to the blade into a pan of the waste collection apparatus, and the flexible comb is configured to interface with a second comb of the waste collection apparatus to scrape material adhered to the flexible comb into the pan of the waste collection apparatus, and
   wherein the blade and the flexible comb are configured to receive at least one wall of a pan of the waste collection apparatus between the blade and the flexible comb.

2. The animal waste removal apparatus as recited in claim 1, wherein the blade includes a sharp corner.

3. The animal waste removal apparatus as recited in claim 1, wherein the blade includes a rounded corner.

4. The animal waste removal apparatus as recited in claim 1, wherein the blade defines at least one aperture.

5. The animal waste removal apparatus as recited in claim 1, wherein the blade includes at least one side skirt.

6. The animal waste removal apparatus as recited in claim 1, wherein the flexible comb extends below a plane formed by the blade.

7. The animal waste removal apparatus as recited in claim 1, wherein the flexible comb comprises an integrally molded ferrule.

8. The animal waste removal apparatus as recited in claim 1, wherein the pan comprises an integrally molded ferrule.

9. A method for removing waste from a surface using an animal waste removal apparatus, the method comprising:
   at least one of: (i) chipping the waste from the surface using a blade connected proximate to a first end of a handle of the waste removal apparatus; or (ii) raking the waste on the surface using a flexible comb connected proximate to the first end of the handle opposite the blade; and
   at least one of: (i) interfacing the blade with a slot of a pan connected proximate to a first end of a second handle of a waste collection apparatus to scrape material adhered to the blade into the pan, the pan including a base and a plurality of walls extending upwardly from the base, one of the plurality of walls including the slot; or (ii) interfacing the flexible comb with a second comb included with another one of the plurality of walls to scrape material adhered to the flexible comb into the pan.

10. The method as recited in claim 9, further comprising:
    supporting the waste removal apparatus on a support surface at least at a first contact point of the blade with the support surface and at a plurality of second contact points of the flexible comb with the support surface.

11. The method as recited in claim 10, further comprising:
positioning a center of gravity of the waste removal apparatus vertically between the first contact point and the plurality of second contact points when the waste removal apparatus is supported on the support surface.

12. The method as recited in claim 9, further comprising:
storing the animal waste removal apparatus at least partially on the animal waste collection apparatus by positioning at least one of the plurality of walls of the animal waste collection apparatus between the blade and the flexible comb of the animal waste removal apparatus.

* * * * *